US010062272B2

(12) United States Patent
Magnus

(10) Patent No.: US 10,062,272 B2
(45) Date of Patent: Aug. 28, 2018

(54) METHOD FOR TESTING A ROTOR BLADE ICE DETECTION SYSTEM AS WELL AS ROTOR BLADE ICE DETECTION SYSTEM AND WIND TURBINE FOR CARRYING OUT THE METHOD

(71) Applicant: Nordex Energy GmbH, Hamburg (DE)

(72) Inventor: Stefan Magnus, Delingsdorf (DE)

(73) Assignee: Nordex Energy GmbH, Hamburg (DE)

( * ) Notice: Subject to any disclaimer, the term of this patent is extended or adjusted under 35 U.S.C. 154(b) by 338 days.

(21) Appl. No.: 14/806,420

(22) Filed: Jul. 22, 2015

(65) Prior Publication Data

US 2016/0027294 A1    Jan. 28, 2016

(30) Foreign Application Priority Data

Jul. 23, 2014 (EP) ..................................... 14178216

(51) Int. Cl.
| | | |
|---|---|---|
| *G08B 29/00* | (2006.01) | |
| *G08B 29/14* | (2006.01) | |
| *G01K 13/08* | (2006.01) | |
| *G01H 13/00* | (2006.01) | |
| *G01P 1/00* | (2006.01) | |
| *F03D 80/40* | (2016.01) | |
| *F03D 17/00* | (2016.01) | |

(52) U.S. Cl.
CPC ............. *G08B 29/14* (2013.01); *F03D 17/00* (2016.05); *F03D 80/40* (2016.05); *G01H 13/00* (2013.01); *G01K 13/08* (2013.01); *G01P 1/06* (2013.01); *F05B 2260/83* (2013.01); *Y02E 10/72* (2013.01)

(58) Field of Classification Search
CPC ............................. F03D 1/00; F05B 2200/00
See application file for complete search history.

(56) References Cited

U.S. PATENT DOCUMENTS

| 7,883,319 B2 | 2/2011 | Volkmer | |
|---|---|---|---|
| 8,186,950 B2 | 5/2012 | Benito et al. | |
| 2005/0276696 A1* | 12/2005 | LeMieux | ................... F03D 7/02 416/61 |
| 2008/0088321 A1* | 4/2008 | Zheng | ................... G01N 27/223 324/667 |
| 2010/0111695 A1 | 5/2010 | Klausmann et al. | |
| 2011/0106331 A1* | 5/2011 | Heuer | .................... B64D 15/20 700/300 |
| 2015/0110624 A1 | 4/2015 | Zhou et al. | |

FOREIGN PATENT DOCUMENTS

| EP | 1 748 185 A1 | 1/2007 |
|---|---|---|
| EP | 2 565 444 A1 | 3/2013 |

* cited by examiner

*Primary Examiner* — Shirley Lu
(74) *Attorney, Agent, or Firm* — Walter Ottesen, P.A.

(57) ABSTRACT

Method for testing a rotor blade ice detection system for a wind turbine, the rotor blade ice detection system being configured to output a warning in the event of icing of a rotor blade being monitored, the method having the following steps of: acquiring data relating to a rotor blade to be monitored, providing at least one value of an operating and/or environmental parameter, modifying the at least one value provided in such a manner that the at least one modified value differs from an actual value of the parameter, evaluating the data relating to the rotor blade to be monitored and the at least one modified value via the rotor blade ice detection system, and testing whether the rotor blade ice detection system outputs a warning.

9 Claims, 2 Drawing Sheets

METHOD FOR TESTING A ROTOR BLADE ICE DETECTION SYSTEM AS WELL AS ROTOR BLADE ICE DETECTION SYSTEM AND WIND TURBINE FOR CARRYING OUT THE METHOD

CROSS REFERENCE TO RELATED APPLICATION

This application claims priority of European patent application no. 14178216.9, filed Jul. 23, 2014, the entire content of which is incorporated herein by reference.

FIELD OF THE INVENTION

Rotor blade ice detection systems for wind turbines are used to output a warning in the event of icing of a rotor blade being monitored. The invention relates to a method which can be used to test the proper operation of such a rotor blade ice detection system and to a rotor blade ice detection system and a wind turbine for carrying out the method.

BACKGROUND OF THE INVENTION

The ice-free state of the rotor blades may be a prerequisite for safe and economical operation of wind turbines. Severe contamination and, in particular, icing of the rotor blades may impair the performance of the system. They may constitute an immediate risk, for example as a result of chunks of ice falling down. Moreover, they may partly cause severe consequential damage, in particular as a result of imbalances and/or different aerodynamic forces. Rotor blade ice detection systems can be used to detect changes to the rotor blades, with the result that suitable countermeasures can be taken. For example, a rotor blade deicing device can be activated or the wind turbine can be switched off if icing of the rotor blades is detected.

United States patent application publication 2010/0111695 discloses a rotor blade ice detection system which records the optical properties of a rotor blade surface using suitable sensors in order to detect icing or adhering snow.

Other known rotor blade ice detection systems evaluate the dynamic behavior of the rotor blades. Such a rotor blade ice detection system is disclosed by EP 2 565 444 A1. In this known system, acceleration sensors are arranged in the rotor blades and a natural frequency of the rotor blade, as determined on the basis of the acceleration data, is monitored for changes. In order to be able to reliably detect icing in this manner, for example, consideration of numerous influencing factors and complex mathematical evaluations are required.

It is difficult to test the proper operation of such a rotor blade ice detection system. For this purpose, icing of the rotor blade must be simulated, for example by fastening weights to the rotor blade. However, this is very complicated since it can be carried out only on site and cannot be carried out or can be carried out only to a very limited extent during ongoing operation, thus requiring the operation of the wind turbine to be interrupted.

SUMMARY OF THE INVENTION

It is an object of the invention to provide a method for testing a rotor blade ice detection system for a wind turbine which can be carried out more easily, and to provide a rotor blade ice detection system and a wind turbine for carrying out this method.

The object is achieved by a method used to test a rotor blade ice detection system for a wind turbine. The rotor blade ice detection system is configured to output a warning in the event of icing of a rotor blade being monitored. The method has the following steps of:
acquiring data relating to a rotor blade to be monitored,
providing at least one value of an operating and/or environmental parameter,
modifying the at least one value provided in such a manner that the at least one modified value differs from an actual value of the parameter,
evaluating the data relating to the rotor blade and the at least one modified value via the rotor blade ice detection system, and
testing whether the rotor blade ice detection system outputs a warning.

A warning can be output in different ways. For example, the rotor blade ice detection system may provide, at an output, a signal which assumes a predefined value when icing is determined. The signal may be transmitted, for example, to a wind turbine controller, especially a wind turbine open-loop controller, or to a superordinate controller of a wind farm. The wind turbine open-loop controller or the superordinate controller is then responsible for taking suitable countermeasures, for example switching off the wind turbine. It is likewise possible to initially only log the warning.

The rotor blade ice detection system is used to monitor at least one rotor blade. All rotor blades of the relevant wind turbine are preferably monitored since icing generally takes place uniformly in all rotor blades. The rotor blade ice detection system may acquire the data relating to a or each rotor blade using at least one suitable sensor in each case which is arranged on or in the rotor blade. The measurement variables recorded by the sensor may be, for example, an acceleration, an elongation, a bending torque or a bending travel. Other measurement variables from which a natural frequency of the rotor blade can likewise be determined are conceivable.

The method also includes providing at least one value of an operating and/or environmental parameter. Operating parameters which may be relevant to the method are, in particular, an active power of the wind turbine, a rotational speed of a rotor of the wind turbine or a pitch angle of the rotor blades being monitored. Values of these operating parameters may be provided, in particular, by a wind turbine open-loop controller which is also referred to as a control system. The wind turbine open-loop controller may predefine the values of these operating parameters when controlling the operation of the wind turbine, for instance if the rotational speed of the rotor is subjected to closed-loop control to a particular rotational speed desired value. Alternatively, the values of the operating parameters may be measured with the aid of suitable sensors. Examples of environmental parameters which may be relevant to the method are a rotor blade temperature, an ambient temperature, a wind speed and a humidity or precipitation intensity. Unlike the operating parameters mentioned, these environmental parameters cannot be readily influenced by a wind turbine open-loop controller. They are therefore generally recorded using suitable sensors, for example using a thermometer which is arranged on a rotor blade surface and is intended to record a surface temperature of the rotor blade or using an anemometer for recording the wind speed.

In the method, at least one provided value of an operating and/or environmental parameter is modified in such a manner that it differs from an actual value. The value is therefore changed relative to the provided value which corresponds to the actual value. For this purpose, a predefined offset may be added or a modification factor may be used, for example. The result is a modified value which deliberately reflects operating conditions which differ from the actual conditions.

The rotor blade ice detection system then evaluates the acquired data relating to the rotor blade and the at least one modified value. In addition to the at least one modified value, the rotor blade ice detection system may use further values of operating and/or environmental parameters which are made available to it. One or more of the evaluated parameters may have been modified in the manner mentioned, while one or more values may likewise be evaluated in the unmodified magnitude originally provided. If the rotor blade ice detection system determines during the evaluation that the evaluated data indicate icing of a rotor blade, it outputs a warning.

In the last method step, a check is carried out in order to determine whether the rotor blade ice detection system outputs a warning. This can be carried out, for example, by a wind turbine open-loop controller which is connected to the rotor blade ice detection system or alternatively by a superordinate controller, for example of a wind farm. It is likewise possible for the rotor blade ice detection system to itself carry out the test in a test mode.

Unlike in the test method described at the outset in which an additional mass is fitted to a rotor blade, the method according to the invention does not require any change whatsoever to the actual operating conditions of the rotor blade. It can be carried out during ongoing operation of the wind turbine and is therefore equally suitable for a functional test of the rotor blade ice detection system during its initial installation and during regular maintenance work. It is possible to very easily determine whether the rotor blade ice detection system reacts to the at least one modified value in an intended manner, namely by outputting a warning. The evaluation carried out by the rotor blade ice detection system is carried out in the method in the manner intended for regular monitoring. In particular, the data relating to the rotor blade which are susceptible to errors under certain circumstances are processed without change. The test is carried out under real conditions of use and is therefore particularly meaningful.

The modification of the at least one value provided may relate, in particular, to an operating and/or environmental parameter which influences the dynamic rotor blade behavior. The dynamic behavior of the rotor blade, which is characterized by the rotor blade ice detection system on the basis of the acquired data relating to the rotor blade, then differs from the relevant expectation if the modified value is assumed. In this case, the rotor blade ice detection system should output a warning, with the result that the proper operation of the rotor blade ice detection system can be easily checked.

In an embodiment, the evaluation of the data relating to the rotor blade via the rotor blade ice detection system includes determining a real natural frequency of the rotor blade to be monitored. The real natural frequency is a meaningful variable which characterizes the dynamic rotor blade behavior. It can be determined by the rotor blade ice detection system from acceleration data, for example via a Fourier analysis. The natural frequency of the rotor blade is influenced by icing of the rotor blade, which is associated with a change in the structural or aerodynamic properties of the rotor blade.

In an embodiment, the evaluation of the at least one modified value via the rotor blade ice detection system includes determining an expected natural frequency of the rotor blade to be monitored. For this evaluation, the rotor blade ice detection system may store a calculation rule or a multidimensional table, in particular, relating to the dependence of the natural frequency on the operating and/or environmental parameters provided. These data may have been determined for each rotor blade type or even for individual rotor blades in model calculations or alternatively experimentally. A comparison of the real natural frequency with the expected natural frequency then provides information relating to whether the actual dynamic behavior of the rotor blade corresponds to the expected dynamic behavior of an ice-free rotor blade in the respective operating and/or environmental conditions.

In an embodiment, the rotor blade ice detection system outputs a warning if the real natural frequency is lower than the expected natural frequency. A reduction in the natural frequency indicates icing of the rotor blade.

In an embodiment, the at least one value includes an operating parameter which is provided by a wind turbine open-loop controller. Many operating parameters which influence the dynamic behavior of the rotor blade are needed to subject the wind turbine to open-loop control and are available to the wind turbine open-loop controller. They can therefore be provided by the wind turbine open-loop controller in a particularly simple manner.

In an embodiment, the at least one value includes an environmental parameter which is provided by a sensor arranged in or on the rotor blade. The environmental parameter may be, for example, a rotor blade temperature, in particular on an aerodynamic surface of the rotor blade or inside the rotor blade. This makes it possible to evaluate parameters which are decisive for icing, for example, in a targeted manner.

In an embodiment, the at least one value includes a measured temperature and the at least one modified value includes a modified temperature which is lower than the measured temperature. For example, an offset in the range of 0.5° to 50° may be subtracted when modifying the value of the measured temperature. The measured temperature may be a surface temperature on the rotor blade or a temperature inside the rotor blade. The natural frequencies of the rotor blade increase at low temperatures on account of the temperature-dependent elasticities of the components. The modification mentioned therefore results in a modified value of the natural frequency which is greater than the real value of the natural frequency. The negative difference between the real natural frequency and the expected natural frequency of the rotor blade is deemed to be icing of the rotor blade and the rotor blade ice detection system should output a warning during proper operation.

In an embodiment, the at least one value includes a real wind speed and a real active power and the at least one modified value includes a modified wind speed which is greater than the measured wind speed and a modified active power which is greater than the real active power. This embodiment is based on the knowledge that the natural frequency of a rotor blade likewise increases under loads, as occur at a high wind speed and high active power. This can be attributed to an increased prestress of the rotor blade on account of the mechanical loads. In the case of this modification of the values provided as well, the real natural frequency is lower than the expected natural frequency, with the result that icing of the rotor blade is assumed. This assessment should result in a warning being output if a rotor blade ice detection system is operating properly.

In an embodiment, the modified wind speed and the modified active power correspond to a power curve of the wind turbine. The power curve indicates the relationship between the wind speed and the active power of the wind turbine. Therefore, the modified pair of values including the wind speed and the active power corresponds to an operating point of the wind turbine which also occurs in reality, with the result that the rotor blade ice detection system is tested under realistic conditions.

In an embodiment, the operation of testing whether the rotor blade ice detection system outputs a warning is carried out by a wind turbine open-loop controller. In this case, the wind turbine can itself test the proper operation of the rotor blade ice detection system.

In an embodiment, the modification of the at least one value is carried out by the rotor blade ice detection system. In this case, the method can be carried out without having to make profound changes to the wind turbine open-loop controller. It suffices to change the rotor blade ice detection system to a test mode in which it carries out the method.

In an embodiment, the modification of the at least one value is carried out by a wind turbine open-loop controller. In this case, values which have already been modified are transferred to the rotor blade ice detection system by the wind turbine open-loop controller for the purpose of carrying out the method. There is then no need to intervene in the rotor blade ice detection system; rather, an accordingly adapted wind turbine can carry out the method using a conventional rotor blade ice detection system.

The above-mentioned object is likewise achieved by a rotor blade ice detection system for a wind turbine. The rotor blade ice detection system has:
- a sensor for arrangement on or in a rotor blade to be monitored,
- an interface for reading in values of at least one operating and/or environmental parameter, and
- an evaluation device for evaluating data acquired using the sensor and data read in via the interface, the evaluation device being configured to output a warning in the event of evidence of icing of the rotor blade to be monitored, wherein
- the rotor blade ice detection system has a device for modifying at least one value read in via the interface in such a manner that the at least one modified value differs from a real value of the parameter and is configured to provide the evaluation device with the at least one modified value for evaluation in a test mode.

The rotor blade ice detection system is configured, in particular, to carry out a method as, for example, described above. The interface may be a hardware interface or a software interface. The reading-in of values is used to mean any form of transferring data to the rotor blade ice detection system. The modification device may be implemented entirely or partially in the form of software, like the evaluation device.

With respect to the features and advantages of the rotor blade ice detection system, reference is made to the above explanations of the method which accordingly apply.

The above-mentioned object is likewise achieved by a wind turbine. The wind turbine has:
- a rotor blade,
- a rotor blade ice detection system which has a sensor arranged in or on the rotor blade, an interface for reading in values of at least one operating and/or environmental parameter and an evaluation device for evaluating data acquired using the sensor and values read in via the interface, the evaluation device being configured to output a warning in the event of evidence of icing of the rotor blade to be monitored, and
- a wind turbine open-loop controller which is connected to the interface and is configured to provide the rotor blade ice detection system with values of the at least one operating and/or environmental parameter, wherein the wind turbine open-loop controller
  has a device for modifying at least one value of an operating and/or environmental parameter in such a manner that the at least one modified value differs from an actual value of the parameter,
  is configured to provide the rotor blade ice detection system with the at least one modified value for evaluation in a test mode, and
  is configured to test whether the rotor blade ice detection system outputs a warning after the at least one modified value has been evaluated.

The wind turbine is configured, in particular, to carry out a method as, for example, described above.

With respect to the features and advantages of the wind turbine, reference is made to the above explanations of the method and the rotor blade ice detection system which accordingly apply.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
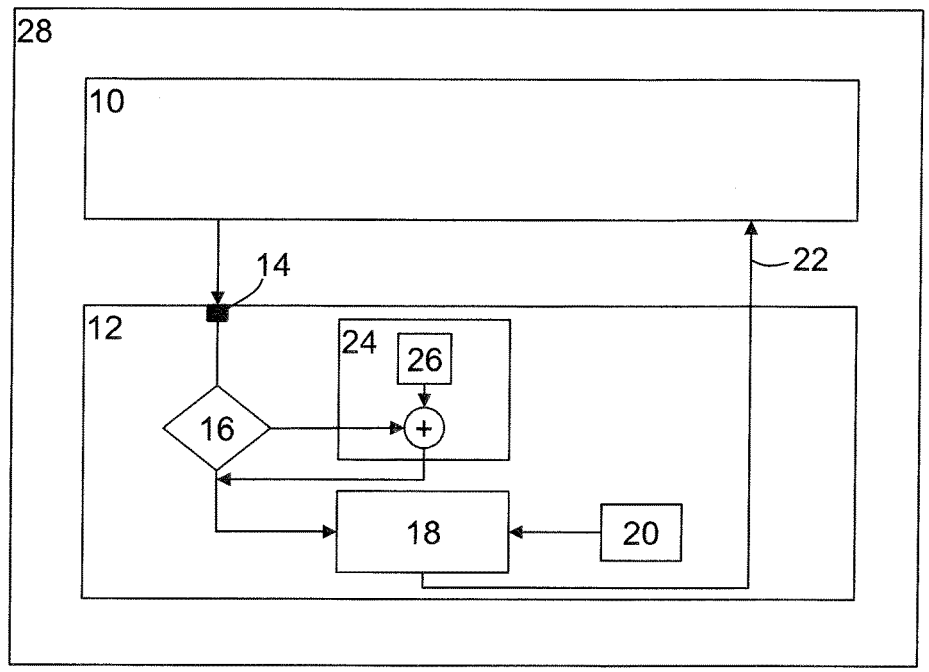
FIG. 1 is a schematic of a wind turbine having a wind turbine open-loop controller and a rotor blade ice detection system.

FIG. 1 schematically shows a wind turbine 28 having a wind turbine open-loop controller 10 and a rotor blade ice detection system 12. The wind turbine open-loop controller 10 controls the operation of the wind turbine 28. It may also be referred to as a central control system.

The rotor blade ice detection system 12 includes an interface 14 which is used by the wind turbine open-loop controller 10 to provide the rotor blade ice detection system 12 with values of different operating and environmental parameters. In the example, these are a real wind speed, a real active power of the wind turbine, a real rotational speed of a rotor of the wind turbine and a real pitch angle of the monitored rotor blades of the wind turbine. These values are read in by the rotor blade ice detection system 12 via the interface 14.

The selection device 16 makes it possible to choose whether the rotor blade ice detection system 12 is intended to be used to monitor a rotor blade during regular operation or is intended to test the proper operation of the rotor blade ice detection system 12 in a test mode.

During regular operation, the values read in via the interface 14 are supplied to the evaluation device 18 of the rotor blade ice detection system 12 without change. The evaluation device 18 may be arranged, for example, in a nacelle of the wind turbine, as can the wind turbine open-loop controller 10. Alternatively, the evaluation device 18 may also be accommodated in a rotor, in particular in the rotor blade of the wind turbine 28 to be monitored.

The evaluation device 18 is connected to at least one acceleration sensor 20 which is arranged on the rotor blade to be monitored and provides the evaluation device 18 with acceleration data.

The evaluation device 18 evaluates the operating and environmental parameters and the acceleration data, in which case it determines a current natural frequency of the rotor blade being monitored on the basis of the acceleration data 20 and determines an expected natural frequency of the rotor blade on the basis of the operating and environmental parameters. If the evaluation indicates icing of the rotor blade, in particular if the real natural frequency is lower than the expected natural frequency by more than a predefined amount, the rotor blade ice detection system 12 outputs a warning which is transmitted to the wind turbine open-loop controller 10, as indicated by the arrow 22.

If a test mode for testing the rotor blade ice detection system 12 is selected using the selection device 16, the device 24 for modifying the rotor blade ice detection system 12 is used. This device adds an offset 26 to at least one operating and/or environmental parameter made available to the rotor blade ice detection system 12 via the interface 14. The value modified in this manner is then transmitted to the evaluation device 18 and is evaluated by the latter in the manner already explained.

The wind turbine rotor blade open-loop controller 10 tests, in the test mode, whether the rotor blade ice detection system 12 outputs a warning on account of the modification of the at least one value.

In the embodiment in FIG. 1, the wind turbine open-loop controller 10 is set up to activate the test mode of the rotor blade ice detection system via the interface 14 and the selection device 16. In addition, it can appropriately react to warnings from the rotor blade ice detection system which can be attributed to the test mode. For the rest, it does not differ from a conventional wind turbine open-loop controller.

Figure 2:
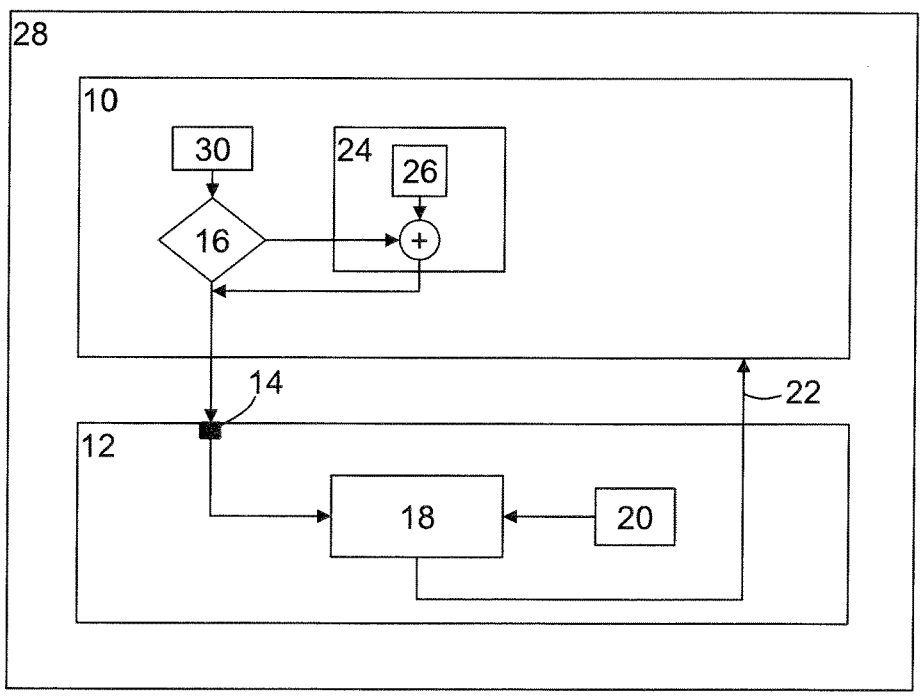
FIG. 2 is a further schematic of a wind turbine having a wind turbine open-loop controller and a rotor blade ice detection system.

In the embodiment in FIG. 2, use is made of a rotor blade ice detection system 12 which resembles the rotor blade ice detection system 12 from FIG. 1 in terms of the interface 14, the evaluation device 18 and the acceleration sensor 20.

The modification device 24 likewise corresponds to the modification device 24 from FIG. 1, but is not integrated in the rotor blade ice detection system 12 but rather in the wind turbine open-loop controller 10. This accordingly applies to the selection device 16 which is used to activate the test mode. The values of the operating and/or environmental parameters are available in the wind turbine open-loop controller 10, as indicated by the box 30. In the test mode, the values which have already been modified are then transferred to the rotor blade ice detection system 12 via the interface 14.

Figure 3:
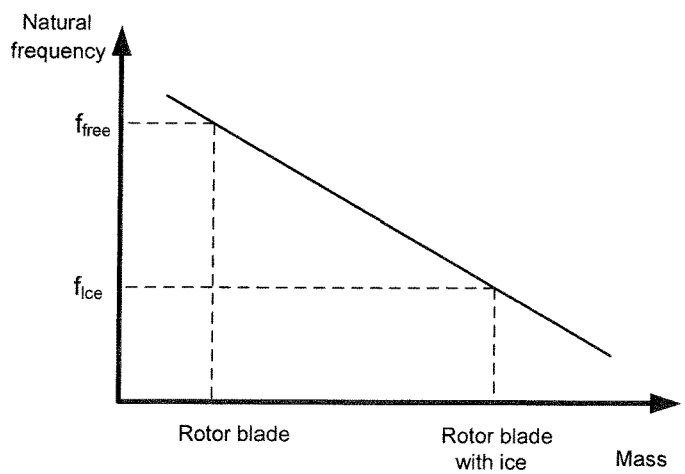
FIG. 3 shows a graph relating to the dependence of the natural frequency of a rotor blade on its mass.
Figure 4:
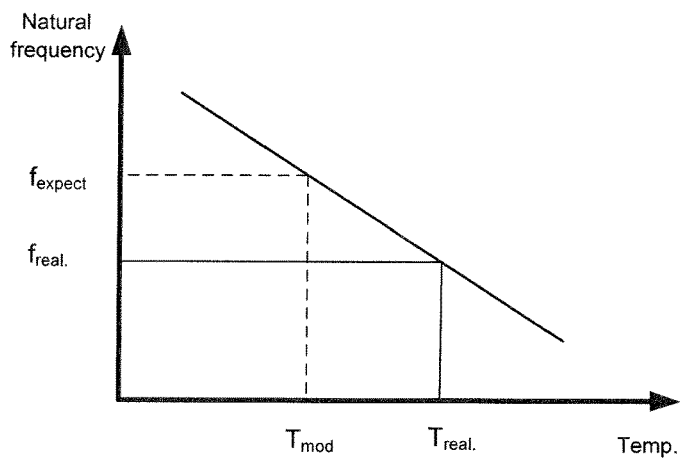
FIG. 4 shows a graph relating to the dependence of the natural frequency of a rotor blade on its temperature; and, FIG. 5 shows a graph relating to the dependence of the natural frequency of a rotor blade on a wind speed and an active power.
Figure 5:
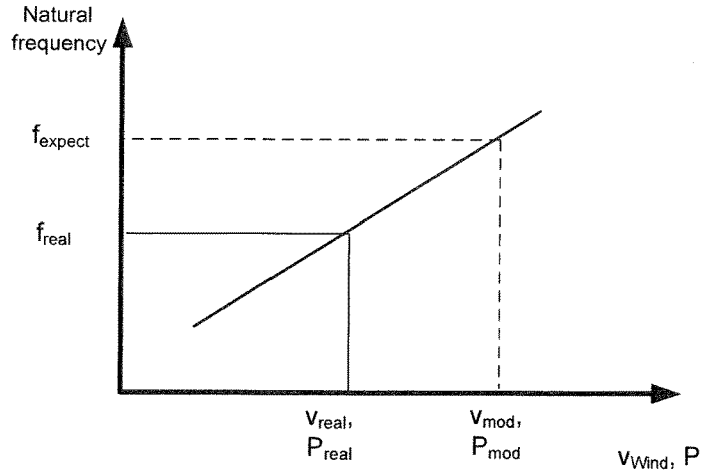

The graphs in FIGS. 3 to 5 are used to explain the dependence of the natural frequency on different parameters. FIG. 3 shows the dependence of the natural frequency of a wind turbine rotor blade on its mass. It is seen that the natural frequency becomes lower with increasing mass. By way of example, the mass of a rotor blade in its initial state without icing is plotted relatively far to the left. A relatively high natural frequency $f_{free}$ is assigned to this mass. The mass of the same rotor blade with ice, which is assigned a considerably lower natural frequency $f_{Ice}$ f is plotted further to the right.

In the invention, the rotor blade ice detection system 12 evaluates the acceleration data received from the acceleration sensor 20 and determines the current natural frequency of the rotor blade being monitored on this basis.

FIG. 4 illustrates the dependence of the natural frequency of the rotor blade on a blade temperature. The rotor blade has the natural frequency $f_{real}$ for a measured temperature $T_{real}$. It is seen that the natural frequency of the rotor blade decreases with increasing temperature. In one embodiment of the invention, the value of the measured temperature $T_{real}$ is modified by adding a negative offset to the measured value. This modified value $T_{mod}$ is then evaluated by the rotor blade ice detection system 12 together with further operating and environmental parameters which have not been modified. This evaluation results in an expected natural frequency $f_{expect}$ which is considerably higher than the natural frequency $f_{real}$ actually present at the measured temperature $T_{real}$. The evaluation device infers, from the negative difference between $f_{real}$ and $f_{expect}$, an increase in mass and therefore an ice build-up which is acknowledged with a warning.

FIG. 5 illustrates the dependence of the natural frequency on a mechanical load which is described by the environmental parameter of the wind speed $v_{wind}$ and the operating parameter of the active power P. It is seen that the natural frequency increases with increasing mechanical load. In this embodiment of the invention, the value of the real wind speed $v_{real}$ or of the real active power $P_{real}$ is modified by adding a positive offset to the measured real values. This modified value $v_{mod}$ or $P_{mod}$ is then evaluated by the rotor blade ice detection system 12 together with further operating and environmental parameters which have not been modified. This evaluation results in an expected natural frequency $f_{expect}$ which is considerably higher than the real natural frequency $f_{real}$ calculated from the acceleration data for the actual wind speed $v_{real}$ or active power $P_{real}$. The evaluation device infers, from the negative difference between $f_{real}$ and $f_{expect}$, an increase in mass and therefore an ice build-up which is acknowledged with a warning.

It is understood that the foregoing description is that of the preferred embodiments of the invention and that various changes and modifications may be made thereto without departing from the spirit and scope of the invention as defined in the appended claims.

LIST OF REFERENCE SYMBOLS USED

10 Wind turbine open-loop controller
12 Rotor blade ice detection system
14 Interface
16 Selection device
18 Evaluation device
20 Acceleration sensor
22 Arrow
24 Modification device
26 Offset
28 Wind turbine
30 Box

What is claimed is:

1. A method for testing a rotor blade ice detection system for a wind turbine having a rotor blade, the rotor blade ice detection system being configured to monitor the rotor blade and output a warning in the event of icing or damage to the rotor blade being monitored, the method comprising the steps of:
    acquiring data relating to the rotor blade to be monitored;
    providing at least one value of at least one of an operating and an environmental parameter;
    modifying the at least one value so as to cause the at least one modified value to differ from an actual value of the parameter and to cause the at least one modified value to represent icing of the rotor blade;
    evaluating the data and the at least one modified value via the rotor blade ice detection system; and,
    testing whether the rotor blade ice detection system outputs a warning as a result of said at least one modified value in combination with said data being evaluated via the rotor blade ice detection system.

2. The method of claim 1, wherein said evaluating the data via the rotor blade ice detection system includes determining a real natural frequency of the rotor blade to be monitored.

3. The method of claim 1, wherein said evaluation of the at least one modified value via the rotor blade ice detection system includes determining an expected natural frequency of the rotor blade to be monitored.

4. The method of claim 2, wherein:
    said evaluation of the at least one modified value via the rotor blade ice detection system includes determining an expected natural frequency of the rotor blade to be monitored; and,
    the rotor blade ice detection system outputs a warning if the real natural frequency is lower than the expected natural frequency.

5. The method of claim 1, wherein the wind turbine has a sensor arranged on or in the rotor blade; and, the at least one value includes an environmental parameter provided by the sensor.

6. The method of claim 1, wherein the at least one value includes a measured real temperature; and, the at least one modified value includes a modified temperature which is lower than the measured real temperature.

7. The method of claim 1, wherein said modifying the at least one value is carried out by the rotor blade ice detection system.

8. A rotor blade ice detection apparatus for monitoring a rotor blade of a wind turbine, the rotor blade ice detection apparatus comprising:
    a sensor configured to capture data and be arranged on or in the rotor blade;
    an interface configured to read in values of at least one parameter;
    said at least one parameter being at least one of an operating parameter and an environmental parameter;
    an evaluation unit configured to evaluate the data captured by said sensor and the values read in by said interface for evidence of icing of the rotor blade;
    said evaluation unit being configured to output a warning in the event of evidence of icing of the rotor blade;
    a modification device configured to modify at least one of the values read in via said interface so as to cause the at least one modified value to differ from an actual value of said at least one said operating parameter and said environmental parameter and to cause the at least modified value to represent an icing of the rotor blade; and,
    said modification device being configured to provide said evaluation unit with said at least one modified value for evaluation in a test mode, wherein it is determined whether said evaluation unit outputs the warning in response to evaluating the at least one modified value in combination with said data.

9. A wind turbine comprising:
    a rotor blade;
    a rotor blade ice detection apparatus for monitoring said rotor blade;
    said rotor blade ice detection apparatus having a sensor, an interface, an evaluation unit, and a modification device;
    said sensor being configured to capture data and be arranged on or in the rotor blade;
    said interface being configured to read in values of at least one parameter;
    said at least one parameter being at least one of an operating parameter and an environmental parameter;
    said evaluation unit being configured to evaluate the data captured by said sensor and the values read in by said interface for evidence of icing of said rotor blade;
    said evaluation unit being configured to output a warning in the event of evidence of icing of the rotor blade;
    said modification device being configured to modify at least one of the values read in via said interface so as to cause the at least one modified value to differ from an actual value of said at least one said operating parameter and said environmental parameter and to cause the at least modified value to represent an icing of the rotor blade; and,
    said modification device being configured to provide said evaluation unit with said at least one modified value for evaluation in a test mode, wherein it is determined whether said evaluation unit outputs the warning in response to evaluating the at least one modified value in combination with said data.

* * * * *